(12) United States Patent
Shimada et al.

(10) Patent No.: US 10,197,019 B2
(45) Date of Patent: Feb. 5, 2019

(54) ETHANOL ENGINE SYSTEM

(71) Applicant: HITACHI, LTD., Tokyo (JP)

(72) Inventors: Atsushi Shimada, Tokyo (JP); Takao Ishikawa, Tokyo (JP); Yuzo Shirakawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 15/311,991

(22) PCT Filed: May 18, 2015

(86) PCT No.: PCT/JP2015/064131
§ 371 (c)(1),
(2) Date: Nov. 17, 2016

(87) PCT Pub. No.: WO2015/178327
PCT Pub. Date: Nov. 26, 2015

(65) Prior Publication Data
US 2017/0089306 A1    Mar. 30, 2017

(30) Foreign Application Priority Data
May 20, 2014    (JP) .................................. 2014-103914

(51) Int. Cl.
*F02M 27/02*    (2006.01)
*F02D 41/02*    (2006.01)
(Continued)

(52) U.S. Cl.
CPC ............. *F02M 27/02* (2013.01); *C01B 3/323* (2013.01); *C01B 3/50* (2013.01); *F02B 9/02* (2013.01);
(Continued)

(58) Field of Classification Search
CPC .......... F02M 27/02; F02D 19/082; F02B 9/02
See application file for complete search history.

(56) References Cited

U.S. PATENT DOCUMENTS

2010/0224141 A1    9/2010    Nakada

FOREIGN PATENT DOCUMENTS

| JP | 2007-56813 A | * | 3/2007 |
| JP | 2007-056813 A | | 3/2007 |

(Continued)

OTHER PUBLICATIONS

Extended European Search Report for Application No. 15796852.0 dated Feb. 9, 2017.

*Primary Examiner* — Kevin A Lathers
(74) *Attorney, Agent, or Firm* — Volpe and Koenig, P.C.

(57) ABSTRACT

An ethanol engine system stabilizes components of reformed gas generated by a reformer and a calorific value of fuel supplied to an engine. The ethanol engine system includes a reservoir tank for an aqueous ethanol solution, a first supply device that supplies the aqueous ethanol solution to the reformer, a separator that cools mixed gas fed from the reformer, including the reformed gas, condenses water vapor included in the mixed gas and separates into gas and liquid, a reformed gas supply device that supplies the reformed gas separated by the separator to the engine, a recovery tank that collects a recovery solution separated by the separator, and a first recovery solution supply device that supplies the recovery solution in the recovery tank to the reformer or a second recovery solution supply device that supplies the recovery solution in the recovery tank to a combustion chamber of the engine.

10 Claims, 9 Drawing Sheets

(51) Int. Cl.
 *F02D 19/08* (2006.01)
 *C01B 3/32* (2006.01)
 *C01B 3/50* (2006.01)
 *F02B 9/02* (2006.01)

(52) U.S. Cl.
 CPC ........... *F02D 19/08* (2013.01); *F02D 19/082* (2013.01); *F02D 41/02* (2013.01); *C01B 2203/0233* (2013.01); *C01B 2203/04* (2013.01); *C01B 2203/046* (2013.01); *C01B 2203/1229* (2013.01); *C01B 2203/148* (2013.01)

(56) References Cited

FOREIGN PATENT DOCUMENTS

| | | |
|---|---|---|
| JP | 2009-074439 A | 4/2009 |
| JP | 2010-014085 A | 1/2010 |
| JP | 2010-106774 A | 5/2010 |
| JP | 2013-204572 A | 10/2013 |
| WO | 2008/016070 A1 | 2/2008 |
| WO | 2011/002722 A1 | 1/2011 |
| WO | 2013/149112 A1 | 10/2013 |

\* cited by examiner (a)

(b)

(c)

ETHANOL ENGINE SYSTEM

TECHNICAL FIELD

The present invention relates to an ethanol engine system that uses ethanol for fuel.

BACKGROUND ART

Ethanol can be acquired from biomass such as a sugar cane and a corn as so-called biofuel. Such carbon neutral ethanol can reduce carbon dioxide ($CO_2$) by being replaced with petroleum fuel. However, the market price of ethanol is higher than that of petroleum fuel and it hinders the popularization of ethanol as fuel.

A manufacturing process of ethanol originated from biomass is roughly classified into a saccharification process, a fermentation process and a dehydration process. Predetermined energy is required to execute each process. However, out of these processes, the dehydration process requires approximately 25% of the whole energy required for the manufacturing process. Accordingly, if an aqueous ethanol solution can be utilized for fuel as it is without using the dehydration process, an amount of energy required for a manufacturing process of alcohol can be reduced and a price of ethanol can be kept down.

In the meantime, efficiency of an engine utilized for a power source in various fields can be effectively enhanced by recovering its exhaust heat. Above all, it is conceivable that an exhaust heat recovery system utilizing the reforming of fuel is important to enhance the efficiency of the engine because the number of parts is small and this exhaust heat recovery system can be operated at a lower cost, compared with another exhaust heat recovery system.

Patent Literature 1 discloses an ethanol engine system in which an aqueous ethanol solution reserved in a reservoir tank is directly injected into a combustion chamber of an engine, a reformed gas generated in a reformer using the aqueous ethanol solution for material is supplied to the engine and motive power is generated by combusting ethanol included in the aqueous ethanol solution and the reformed gas in the combustion chamber.

The aqueous ethanol solution is fuel suitable for the exhaust heat recovery system because the reformed gas including hydrogen can be generated from the aqueous ethanol solution by an endothermic reaction by utilizing its exhaust heat.

Further, as hydrous ethanol has a great latent heat of evaporation to its calorific value, the inside of the combustion chamber can be cooled by directly supplying the hydrous ethanol to the engine. Thereby, a quantity of heat that escapes in a cooling water for the engine can be reduced and the efficiency of the system can be enhanced by increasing energy by exhaust heat for shaft power.

CITATION LIST

Patent Literature

Patent Literature 1: Japanese Unexamined Patent Application Publication No. 2013-204572

SUMMARY OF INVENTION

Technical Problem

In Patent Literature 1, a configuration that a reformed gas fed from the reformer and an unreformed aqueous ethanol solution are separated in a separator and the separated aqueous ethanol solution is returned to the reservoir tank again is adopted. Therefore, as an ethanol concentration of a hydrous ethanol in the reservoir tank lowers, a calorific value of ethanol supplied to the engine, components of the reformed gas generated in the reformer and an endothermic energy amount in reforming are labile, and deterioration of a thermal efficiency is caused. Besides, in Patent Literature 1, an ethanol concentration sensor is provided to the reservoir tank so as to manage the concentration of ethanol, although Patent Literature 1 has a problem that control corresponding to variation of the ethanol concentration is required, the control and the system are made intricate and driving is limited by the variation of the ethanol concentration.

Then, an object of the present invention is to stabilize the components of the reformed gas generated by a reformer and a calorific value of fuel supplied to an engine and to provide an ethanol engine system having a high thermal efficiency.

Solution to Problem

The ethanol engine system according to the present invention has a characteristic that the system is provided with a reservoir tank of an aqueous ethanol solution, a first supply device that supplies the aqueous ethanol solution in the reservoir tank to a reformer, a separator that cools a mixed gas including a reformed gas fed from the reformer, condenses water vapor included in the mixed gas and separates into gas and liquid, a reformed gas supply device that supplies the reformed gas separated in the separator to an engine, a recovery tank that collects recovery solution separated in the separator, and a first recovery solution supply device that supplies recovery solution in the recovery tank to the reformer or a second recovery solution supply device that supplies recovery solution in the recovery tank to a combustion chamber of the engine.

Advantageous Effects of Invention

According to the present invention, the ethanol engine system that stabilizes components of the reformed gas generated in the reformer and a calorific value of fuel supplied to the engine and has a high thermal efficiency can be provided.

DESCRIPTION OF EMBODIMENTS

Figure 1:
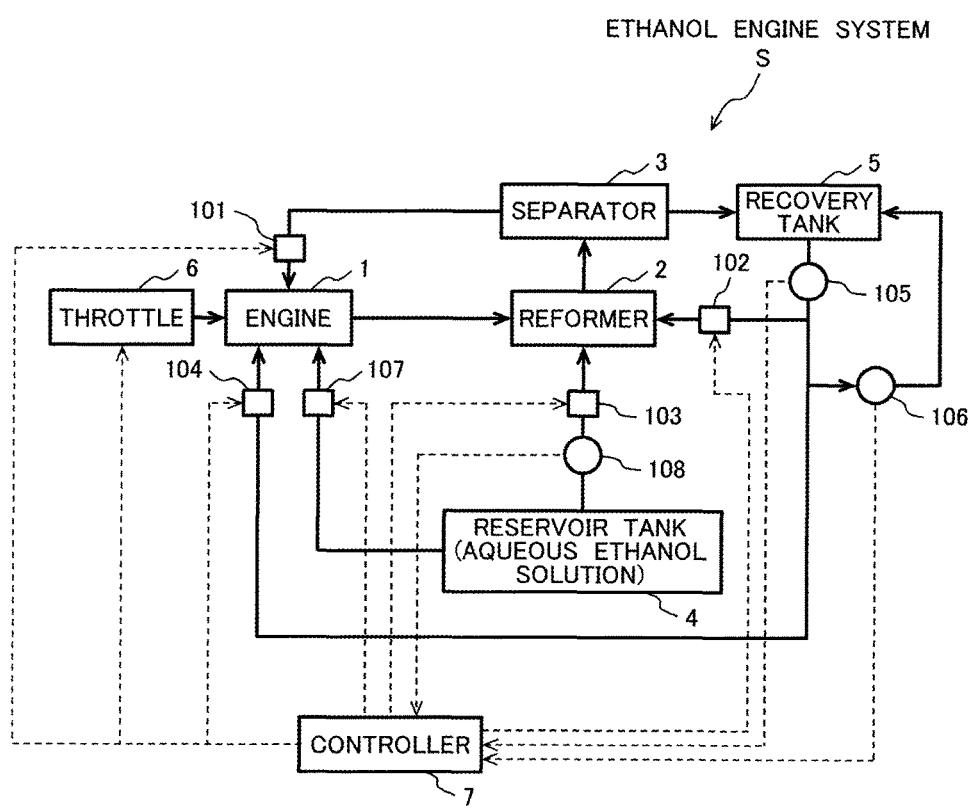
FIG. 1 illustrates a configuration of an ethanol engine system equivalent to an embodiment of the present invention.

Suitably referring to the drawings, embodiments of the present invention will be described in detail below.

First Embodiment

An ethanol engine system equivalent to this embodiment generates a motive power by supplying a reformed gas acquired by using ethanol for a carbon source and an aqueous ethanol solution to an engine. The configuration of the ethanol engine system, reforming materials and the aqueous ethanol solution used for fuel and the operation of the ethanol engine system will be described below.

<Configuration of Ethanol Engine System>

FIG. 1 illustrates the configuration of the ethanol engine system equivalent to the embodiment of the present invention. As shown in FIG. 1, the ethanol engine system S equivalent to this embodiment is configured by a reservoir tank 4 that reserves an aqueous ethanol solution, an engine 1, a reformer 2, a separator 3, a recovery tank 5 and a controller 7. The aqueous ethanol solution is supplied to the engine 1 from the reservoir tank 4 by a second supply device 107 as shown in FIG. 1 and a reformed gas from the reformer 2 is supplied to the engine 1 via the separator 3 and a reformed gas supply device 101. Hereby, the engine 1 generates motive power by the combustion of ethanol included in the aqueous ethanol solution and the reformed gas. At this time, in the reformer 2, the reformed gas generated by reforming reaction by using the aqueous ethanol solution supplied from the reservoir tank 4 via the first supply device 103 for material and a mixed gas including ethanol vapor which is an unreacted component and water vapor are generated. The mixed gas generated in the reformer 2 is fed to the separator 3, the water vapor included in the mixed gas is condensed, the reformed gas, the ethanol vapor and water are separated into gas and liquid there, and the reformed gas and the ethanol vapor are supplied to the engine 1 via the reformed gas supply device 101. In the meantime, recovery solution (concentrated water) separated into gas and liquid in the separator 3 is collected in the recovery tank 5. The ethanol engine system S in this embodiment has a characteristic that the recovery solution collected in the recovery tank 5 is respectively supplied to the reformer 2 and a combustion chamber of the engine 1 via a first recovery solution supply device 102 and a second recovery solution supply device 104. The concentration of the aqueous ethanol solution in the reservoir tank 4 never varies by adopting the configuration that the recovery solution separated in the separator 2 is collected in the reservoir tank 5 as described above and is supplied to the reformer 2 or the combustion chamber of the engine 1, control corresponding to the variation of the ethanol concentration in the reservoir tank 4 is not required, and the system can be simplified. Besides, the operation of the engine 1 is not restricted by the variation of the ethanol concentration in the reservoir tank 4.

Moreover, components of the reformed gas can be stably generated in the reformer 2 by adopting a configuration that the recovery solution in the recovery tank 5 is supplied to the reformer 2, the concentration of hydrogen in the reformed gas can be kept high, and effect for enhancing system efficiency thereby is acquired. In addition, water-rich liquid can be supplied to the combustion chamber of the engine 1 by adopting the configuration that the recovery solution in the recovery tank 5 is supplied to the combustion chamber of the engine 1, thereby, cooling loss of the engine is reduced, and effect for enhancing thermal efficiency is acquired. Especially, remarkable effect is acquired by applying the configuration to an engine in which a heat shield is built in the combustion chamber of the engine. Further, the temperature of a working medium in a cylinder can be lowered by the latent heat of evaporation of the water-rich liquid by directly supplying the water-rich liquid to the combustion chamber and anti-knocking performance is enhanced. Furthermore, since the anti-knocking performance is also chemically high because ethanol is high octane number fuel, high compression ratio combustion can be realized and the high-efficiency system can be realized.

The ethanol engine system S shown in FIG. 1 has the configuration that the recovery solution can be supplied to both the reformer 2 and the combustion chamber of the engine 1 from the recovery tank 5. However, the ethanol engine system S may also have a configuration that the recovery solution is supplied to only either the reformer 2 or the combustion chamber of the engine 1.

Well-known supply means such as an injector and a pump is applied to the first and second supply devices 103, 107, the reformed gas supply device 101, the first and second recovery solution supply devices 102, 104, and a supplied amount, supplied pressure and others are controlled by the controller 7.

<<Engine>>

Figure 2:
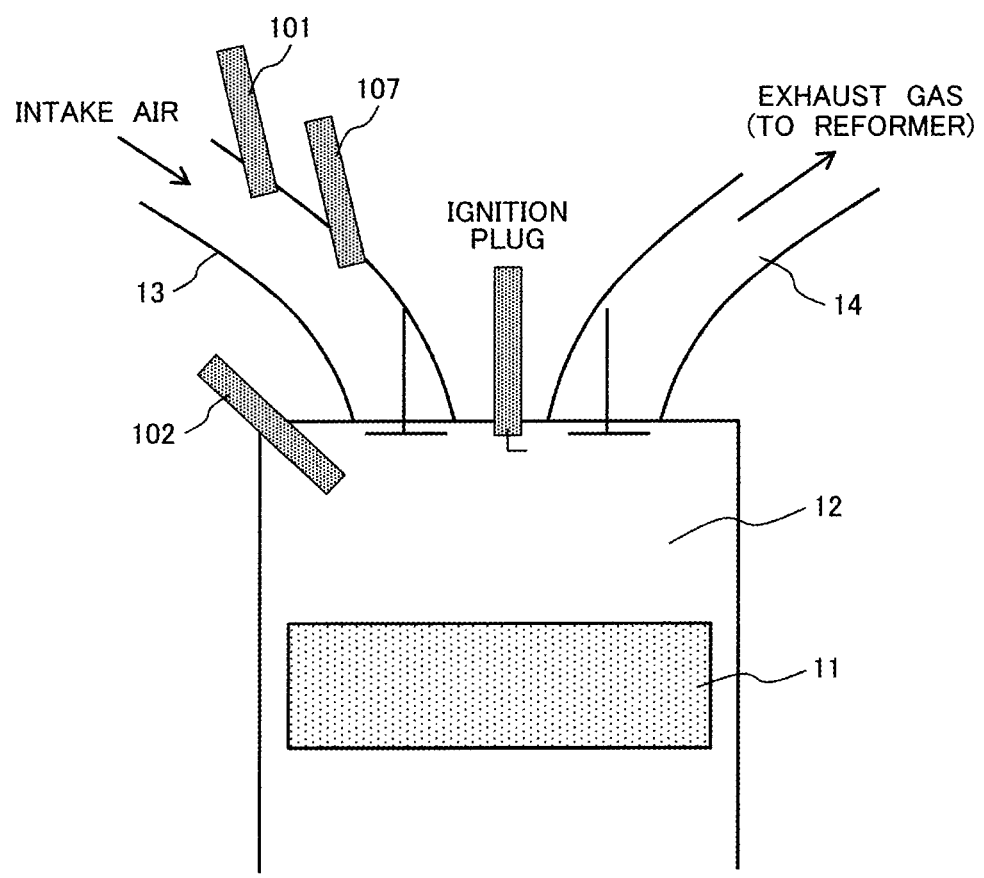
FIG. 2 is a partial enlarged view schematically showing the vicinity of a cylinder head of an engine configuring the ethanol engine system equivalent to the embodiment of the present invention.

FIG. 2 is a partial enlarged view schematically showing the vicinity of a cylinder head of the engine configuring the ethanol engine system equivalent to this embodiment. The engine 1 is provided with a piston 11 reciprocated in the cylinder, and an intake pipe 13 and an exhaust pipe 14 are connected to the combustion chamber 12 in the cylinder. The second supply device 107 for supplying the aqueous ethanol solution to the engine is attached to the intake pipe 13. It should be noted that the second supply device 107 for supplying the aqueous ethanol solution to the engine may also have a structure for directly injecting the aqueous ethanol solution into the combustion chamber of the engine. Hereby, a structure that water-rich liquid is supplied to the engine and the engine can be cooled from the inside of the combustion chamber is acquired. Consequently, cooling loss of the engine is reduced, and the thermal efficiency and exhaust heat of the engine increase. Besides, the reformed gas supply device 101 for supplying the reformed gas fed from the separator 3 to the engine is attached to the intake pipe 13 and the reformed gas is supplied to the engine together with intake air. Moreover, the second recovery solution supply device 102 for supplying recovery solution in the recovery tank 5 to the combustion chamber of the engine 1 is connected to the combustion chamber of the engine 1. The quantity of solution required for cooling the inside of the combustion chamber can be secured by directly supplying recovery solution to the combustion chamber of the engine 1 from the second recovery solution supply device 102 even if a relatively high-concentration aqueous ethanol solution is used.

In addition, it is desirable that materials low in thermal conductivity are used for the piston 11 and for example, SUS304, ductile iron, a magnesium alloy and others are used. Further, composite material acquired by coating a surface of base material such as an aluminum alloy and irony material with a zirconia film and others may also be used. The combustion chamber of the engine can be effectively shielded from heat by using such low-thermal conductivity piston material and directly supplying water-rich liquid to the combustion chamber and the cooling loss of the engine can be reduced.

<<Reformer>>

As shown in FIG. 1, the aqueous ethanol solution is supplied to the reformer 2 from the reservoir tank 4 via the first supply device 103 and exhaust gas is supplied to the reformer from the engine 1. Hereby, the reformer 2 generates the reformed gas using the aqueous ethanol solution for material. Besides, recovery solution can be supplied to the reformer 2 from the recovery tank 5 via the first recovery solution supply device 102.

To explain further in detail, the reformer 2 is warmed up by exhaust gas from the engine 1 and generates the reformed gas having carbon monoxide and hydrogen as principal components by exchanging heat with the aqueous ethanol solution. Reforming reaction is shown in the following expression (1).

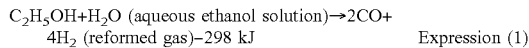

$$C_2H_5OH + H_2O \text{ (aqueous ethanol solution)} \rightarrow 2CO + 4H_2 \text{ (reformed gas)} - 298 \text{ kJ} \qquad \text{Expression (1)}$$

As shown in the expression (1), the reaction that reforms the aqueous ethanol solution to carbon monoxide (CO) and hydrogen ($H_2$) is endothermic reaction and energy of 298 kJ is absorbed by reforming ethanol ($C_2H_5OH$) of 1 mol. The lower heating value of ethanol of 1 mol is 1235 kJ, when the reforming reaction in the expression (1) is all performed, the lower heating value of the reformed gas is 1533 kJ, and the lower heating value is enhanced by 1.24 times. Exhaust heat is recovered for energy of fuel by performing this reaction utilizing engine exhaust heat and consequently, the efficiency of the system is enhanced.

The quantity of the aqueous ethanol solution supplied to the reformer 2 is adjusted according to the temperature and the pressure of the reformer 2, however, if only the quantity can be adjusted in a range in which the quantity set according to required torque and others of the engine 1 of the reformed gas injected from the reformed gas supply device 101 can be secured, the quantity of the aqueous ethanol solution supplied to the reformer 2 is not especially limited.

Incidentally, reforming temperature of ethanol is lower, compared with that of another gasoline and fuel such as toluene and is approximately 250 to 500° C. Accordingly, a criterion for judgment on terminating a warming-up process of the reformer by exhaust gas of the engine in this embodiment can be set to the temperature of approximately 250 to 500° C. of a reaction cell 31 (see FIG. 3(a)) described later of the reformer for example. Besides, as for injection control over the reformed gas supply device 101, the temperature of approximately 250 to 500° C. of the reaction cell 31 can also be used for a criterion.

Figure 3:
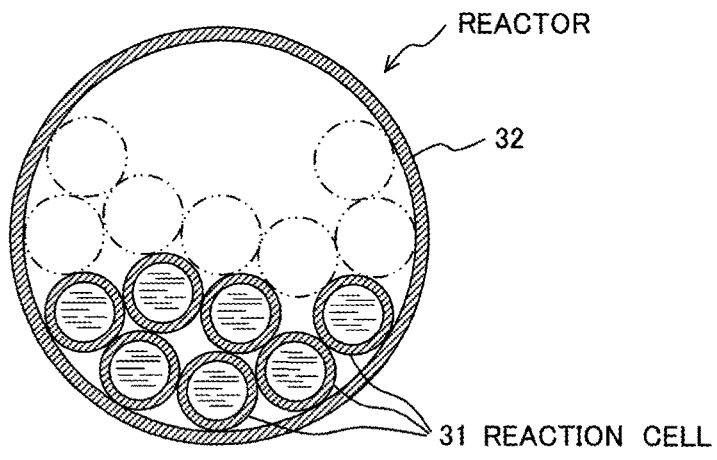
FIG. 3(a) is a sectional view showing a reformer configuring the hydrous ethanol supply engine system equivalent to the embodiment of the present invention, (b) is a sectional view showing a reaction cell built in the reformer, and (c) is a sectional view showing a reaction sheet built in the reaction cell.
Figure 3:
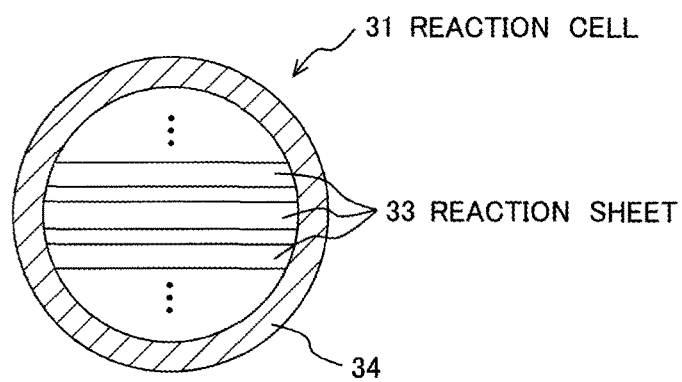
Figure 3:
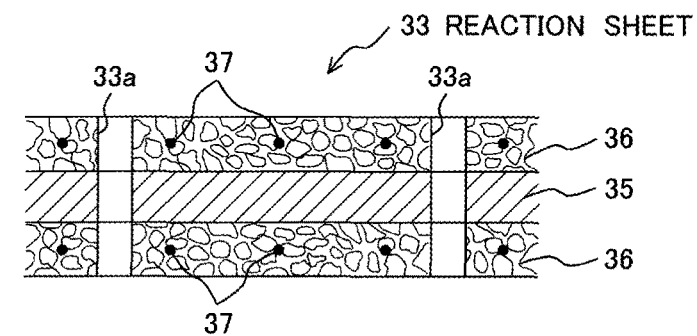

FIG. 3(a) referred next is a sectional view showing the reformer that configures the ethanol engine system equivalent to this embodiment of the present invention, FIG. 3(b) is a sectional view showing the reaction cell built in the reformer, and FIG. 3(c) is a sectional view showing a reaction sheet built in the reaction cell.

As shown in FIG. 3(a), the reformer is provided with plural reaction cells 31 having a cylindrical outline and a cylindrical first casing 32 housing the plural reaction cells 31.

The reformer is configured so that the aqueous ethanol solution in the reservoir tank 4 flows through each reaction cell 31. Besides, the reformer is configured so that high-temperature exhaust gas exhausted via the exhaust pipe 14 (see FIG. 2) of the engine 1 flows outside the reaction cell 31 and inside the first casing 32.

The first casing 32 and a second casing 34 to be described later are made of metal such as SUS to raise their thermal conductivity.

A shape of the first casing 32 and the second casing 34 is not limited to a cylindrical shape and in addition, for example, they may also be square cylindrical or polygonal cylindrical.

The reaction cell 31 is provided with laminated plural reaction sheets 33 and the second casing 34 housing the plural reaction sheets 33 as shown in FIG. 3(b).

Each reaction sheet 33 is provided with metal foil 35 which is base material, porous layers 36 formed on both surfaces of the metal foil 35 and catalysts 37 carried in the porous layer 36 as shown in FIG. 3(c).

That is, each reaction sheet 33 has a three-layer structure in which the porous layer 36 carrying the catalysts 37, the metal foil 35 and the porous layer 36 carrying the catalysts 37 are laminated in their order.

Clearance through which the aqueous ethanol solution, generated hydrogen ($H_2$) and generated carbon monoxide (CO) can flow is formed between the reaction sheets 33 adjacent in a direction of the thickness.

Besides, as the reaction sheet 33 is thin, its heat capacity is small, heat is promptly conducted in the reaction sheet 33 and promptly raises temperature up to temperature at which the catalyst 37 satisfactorily fulfills its catalytic function.

Hereby, the efficiency of decomposition reaction for decomposing the aqueous ethanol solution into hydrogen ($H_2$) and carbon monoxide (CO) is enhanced.

Further, plural through holes 33a are formed in each reaction sheet 33.

Hereby, heat of exhaust gas is satisfactorily conducted in the direction of the thickness, and the aqueous ethanol solution, generated hydrogen ($H_2$) and generated carbon monoxide (CO) also satisfactorily flow in the direction of the thickness via the through holes.

The metal foil 35 is made of aluminum foil for example and the thickness is set to approximately 50 to 200 μm. However, the whole reaction sheet 33 may also have a porous structure not provided with the metal foil 35 or provided with a porous layer which is base material in place of the metal foil 35.

The porous layer 36 is a layer for carrying the catalysts 37 and is provided with plural pores through which the aqueous ethanol solution, generated hydrogen ($H_2$) and generated carbon monoxide (CO) can flow.

The above-mentioned porous layer 36 is made of oxide mainly composed of alumina, niobium oxide and zirconium oxide for example.

The catalyst 37 is a catalyst for decomposing the aqueous ethanol solution and generating the reformed gas (hydrogen and carbon monoxide) as shown in the above-mentioned expression (1).

The catalyst 37 described above is composed of at least one selected out of platinum, nickel, palladium, rhodium, iridium, ruthenium, molybdenum, rhenium, tungsten, vanadium, osmium, chromium, cobalt, iron, niobium, copper, zinc and others.

<<Separator>>

The separator 3 cools the mixed gas including the reformed gas fed from the reformer 2 and separates water from the reformed gas and ethanol vapor by vapor-liquid separation by condensing water vapor including the mixed gas. Ethanol vapor which is an unreacted component and water vapor may intermingle in the gas generated in the reformer 2. When water vapor which is an unreacted component is supplied to the engine 1 together with the reformed gas, combustion efficiency is deteriorated. Therefore, water vapor is liquefied by the separator 3 and is collected in the recovery tank 5. In the meantime, from a viewpoint of stabilizing a calorific value of fuel supplied to the engine, it is desirable that ethanol vapor is supplied to the engine without being liquefied. To preferentially collect water in the separator 3, it is desirable that the temperature of the mixed gas emitted from the separator 3 is controlled to be higher than 78° C. which is a boiling point of ethanol and to be below 100° C. which is a boiling point of water. Hereby, a high-concentration water can be collected as a recovery solution from the mixed gas in the separator 3. In this case, the recovery solution is water or an aqueous solution having water as a principal component. The aqueous solution is concretely an aqueous ethanol solution, the concentration of ethanol can be made equal to or below 10 wt %, and it is desirable that the concentration is as low as possible.

The separator 3 may also have a structure for exchanging heat with cooling water for the engine 1 or a structure for exchanging heat between gas generated in the reformer 2 and the aqueous ethanol solution supplied to the reformer 2. In the case of the latter, as cooling heat of gas generated in the reformer 2 can be utilized for heating hydrous ethanol, an amount for heating the aqueous ethanol solution can be reduced. Consequently, a calorific value used for reforming reaction in the reformer 2 can be increased.

In the meantime, the recovery solution collected in the recovery tank is pressurized by a pump 105 and is supplied to the reformer 2 by the first recovery solution supply device 102 again. The reason why the recovery solution is supplied to the reformer 2 again is as follows.

The reforming reaction of the aqueous ethanol solution in the expression (1) meets a stoichiometry when ethanol and water have the same number of moles. However, to stably enhance conversion ratio, it is important that the number of moles of water is increased, a rate of water and ethanol is stabilized on a water excess condition and they are reacted. The reason is that as the number of moles of water is close to the stoichiometry, carbon is educed on a surface of the catalyst, the activity of the catalyst is readily deteriorated and consequently, a conversion ratio from the aqueous ethanol solution to the reformed gas is deteriorated. Besides, when the rate of water and ethanol varies, the following side reaction formulas (2) to (4) except the expression (1) of dehydrogenation reaction of ethanol and others are effected and components of the reformed gas readily vary. Especially, when a rate of hydrogen having a great effect on the combustion of the engine varies, the thermal efficiency of the engine is also influenced.

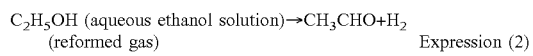
Expression (2)

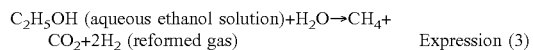
Expression (3)

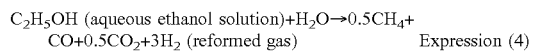
Expression (4)

That is, to stably generate the reformed gas from the aqueous ethanol solution and enhance the concentration of hydrogen, it is required that a rate of ethanol and water supplied to the reformer 2 is stably made water-rich. In the meantime, the concentration of water in the aqueous ethanol solution supplied to the reformer 2 can be enhanced by supplying water collected in the recovery tank 5 to the reformer 2 and the concentration of hydrogen in the reformed gas can be stably enhanced. Consequently, a hydrogen-rich gas can be supplied to the engine and a combustion rate in the engine can be raised. Besides, as an endothermic energy amount is stably enhanced because the reaction in the expression (1) positively occurs, an exhaust heat recovery amount of the engine consequently increases and the efficiency of the system is stably enhanced.

The concentration of water in hydrous ethanol in the reformer 2 can be stably enhanced by supplying the recovery solution to the reformer 2 as described above. Hereby, components of the reformed gas generable in the reformer 2 are stabilized and additionally, hydrogen concentration in the reformed gas can be enhanced. Hereby, an endothermic energy amount in the reformer 2 and hydrogen concentration in the reformed gas supplied to the engine can be stably enhanced.

Besides, the recovery solution collected in the recovery tank is pressurized by the pump 105 and is supplied to the combustion chamber of the engine 1 via the second recovery solution supply device 102. The engine can be cooled from its inside without varying a calorific value of fuel supplied to the engine by supplying the recovery solution to the engine. Hereby, cooling loss can be reduced and exhaust heat can be increased, stably combusting the engine.

Figure 4:
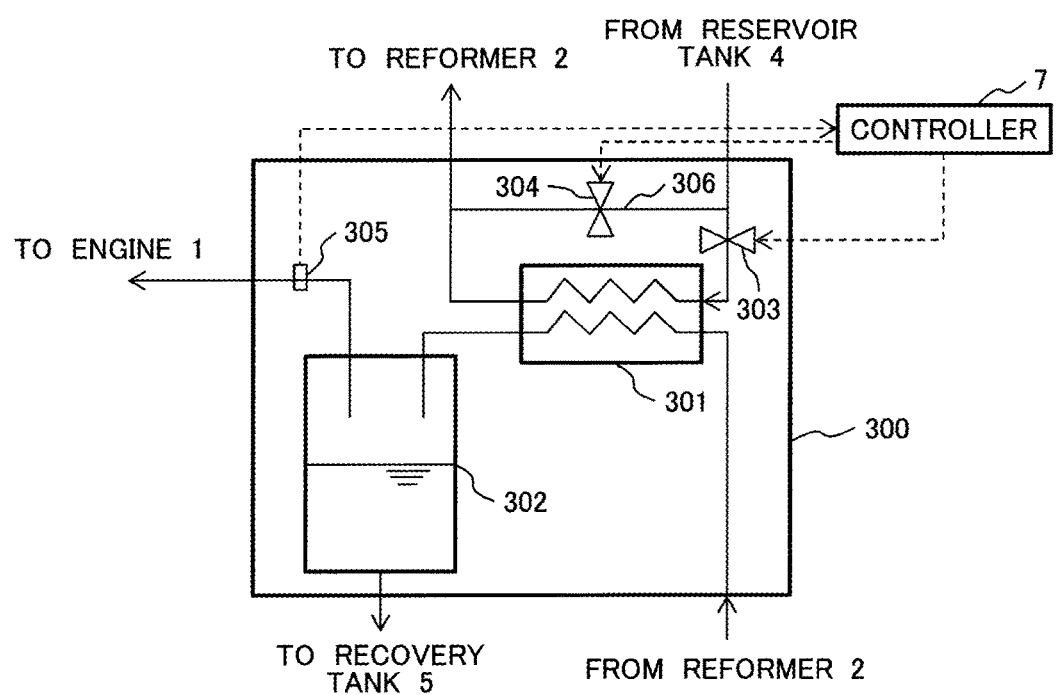
FIG. 4 illustrates the configuration of a separator configuring the ethanol engine system equivalent to the embodiment of the present invention.

FIG. 4 shows one example of the configuration of the separator. As shown in FIG. 4, a separation unit 300 is configured by a condenser 301 and a drain tank 302. The temperature of a mixed gas including the reformed gas, ethanol vapor and water vapor and fed from the reformer 2 is approximately 300° C. The condenser 301 exchanges heat between the mixed gas fed from the reformer 2 and a predetermined cooling medium (coolant) and condenses water vapor included in the mixed gas. The mixed gas the water vapor of which is condensed in the condenser 301 and water are carried into the drain tank 302 and are separated into gas and liquid. The reformed gas and ethanol vapor separated into gas and liquid in the drain tank 302 are supplied to the engine 1. The condensed high-concentration water is extracted from a bottom of the drain tank 302 and is collected in the recovery tank 5.

For coolant for cooling mixed gas in the condenser 301, cooling water for the engine 1 and fluid such as air can also be used. However, it is desirable that the aqueous ethanol solution supplied to the reformer 2 from the reservoir tank 4 is used. That is, after the aqueous ethanol solution is supplied to the condenser 301 from the reservoir tank 4 and is heated by heat exchange with mixed gas in the condenser 301, the aqueous ethanol solution is supplied to the reformer 2. Hereby, sensible heat and latent heat of the aqueous ethanol solution supplied to the reformer 2 can be collected in the condenser 301 and consequently, a rate of exhaust heat used for reforming reaction in the reformer 2 increases. Hereby, the efficiency of the whole system can be enhanced.

To condense only water vapor and collect high-concentration water in the condenser 301 of the separation unit 300, it is desirable that the temperature of mixed gas fed from the condenser 301 is controlled to be equal to or higher than 78° C. which is the boiling point of ethanol and to be below 100° C. which is the boiling point of water.

Control over temperature is executed by the following method. As shown in FIG. 4, a line 306 through which the aqueous ethanol solution is supplied from the reservoir tank 4 to the reformer 2 via the condenser 301 and a bypass line 307 through which the aqueous ethanol solution is directly supplied to the reformer 2 without passing the condenser 301 are provided, and regulating valves 303, 304 that can regulate a flow rate on respective lines are provided. A supplied amount of the aqueous ethanol solution supplied to a heat exchanger is adjusted by regulating an aperture of the regulating valves 303, 304 on the basis of the temperature detected by a temperature sensor 305 of mixed gas fed from the condenser 301 by the controller 7, and the temperature of the mixed gas after passing the condenser 301 is controlled. In FIG. 4, the temperature sensor 305 is installed on a line through which the reformed gas is supplied to the engine 1 from the drain tank 302. However, the temperature sensor may also be installed between the condenser 301 and in the drain tank 302 and in the drain tank 302. Besides, the temperature control method according to the configuration shown in FIG. 4 is one example, the temperature of mixed gas has only to be controlled, and another method may also be adopted.

Moreover, for coolant supplied to the condenser 301, both aqueous ethanol solution from the reservoir tank 4 and recovery water supplied to the reformer 2 from the recovery tank 5 may also be used. In this case, sensible heat and latent heat of the recovery water supplied to the reformer 2 can be collected in the condenser 1 and a rate of exhaust heat utilized for reforming the aqueous ethanol solution in the reformer increases.

<<Aqueous Ethanol Solution>>

Water becomes excessive by reforming reaction of the aqueous ethanol solution in the expression (1) by utilizing the aqueous ethanol solution below 72 wt % as ethanol concentration for the aqueous ethanol solution let in the reservoir tank 4 and water liquefied in the separator 3 via the reformer 2 is collected in the recovery tank. Especially, it is desirable that the aqueous ethanol solution below 60 wt % is used for the aqueous ethanol solution let in the reservoir tank 4. This reason is that since the aqueous ethanol solution below 60 wt % as ethanol concentration does not correspond to hazardous materials of File Service Act, its handling is easy. Besides, since a storage amount of the aqueous ethanol solution is not limited, large-capacity fuel can be more safely used and merit for a user is enhanced. Since the concentration of liquid in the recovery tank 5 is never equal to or higher than 60 wt % when ethanol concentration in the reservoir tank 4 is below 60 wt %, liquid used in this system is all out of a range of hazardous materials.

<<Controller>>

Next, the controller 7 (see FIG. 1) that electronically controls the ethanol engine system S will be described.

The controller 7 is configured by CPU, ROM, RAM, various interfaces, electronic circuits and others and synthetically controls the ethanol engine system S according to a program stored inside. The controller 7 controls each supply device, the pump, the throttle and others respectively shown in FIG. 1 according to a procedure described later. The procedure which the controller 7 executes will be described in detail later together with the description of the operation of the ethanol engine system S.

<<Operation of Ethanol Engine System>>

Next, the operation of the ethanol engine system S in this embodiment will be described.

Figure 5:
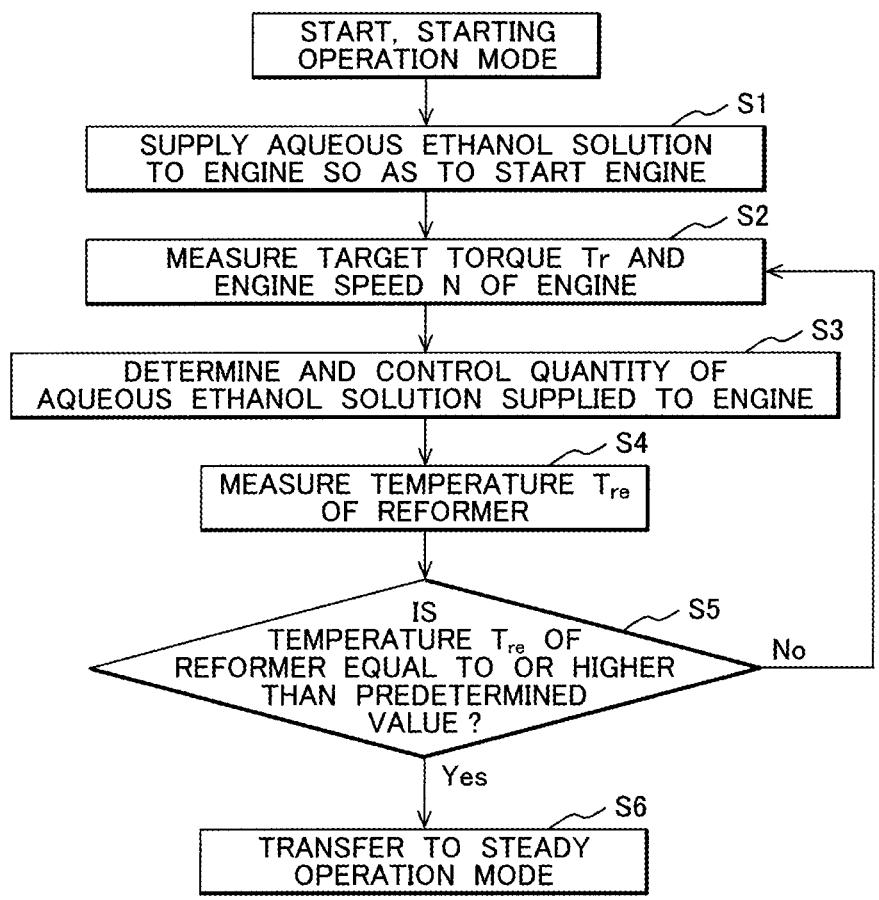
FIG. 5 shows a control flow in a starting operation mode of the ethanol engine system equivalent to the embodiment of the present invention.

FIG. 5 shows an operation mode from starting to steady operation. As it is difficult to generate the reformed gas from the aqueous ethanol solution in the reformer 2 because the temperature of the reformer 2 is low in starting, a control signal that the aqueous ethanol solution is directly supplied to the engine is transmitted from the controller 7 to the second supply device 107 (a step S1). After the engine is started, target torque and engine speed of the engine are measured (a step S2). Afterward, the quantity of the aqueous ethanol solution supplied to the engine is determined according to the target torque and the engine speed and a control signal is transmitted from the controller 7 to the second hydrous ethanol supply device 107 (a step S3). Afterward, the temperature $T_{re}$ of the reformer 2 is measured by a temperature sensor not shown arranged in a suitable location of the reaction cell of the reformer 2 (a step 4). It is determined whether the temperature of the reformer 2 is equal to or higher than a predetermined value or not (a step 5). The predetermined temperature is for judging whether the reformer 2 is warmed up to predetermined reforming temperature or not and is preset in a range of 250 to 500° C. for example. As it is difficult to generate the reformed gas in the reformer 2 when the temperature of the reformer 2 is equal to or below the predetermined value, the process is returned to the step S2. When the temperature of the reformer 2 is equal to or higher than the predetermined value, it is judged that the reformed gas can be generated in the reformer 2 and the process proceeds to the steady operation mode (a step S6).

Figure 6:
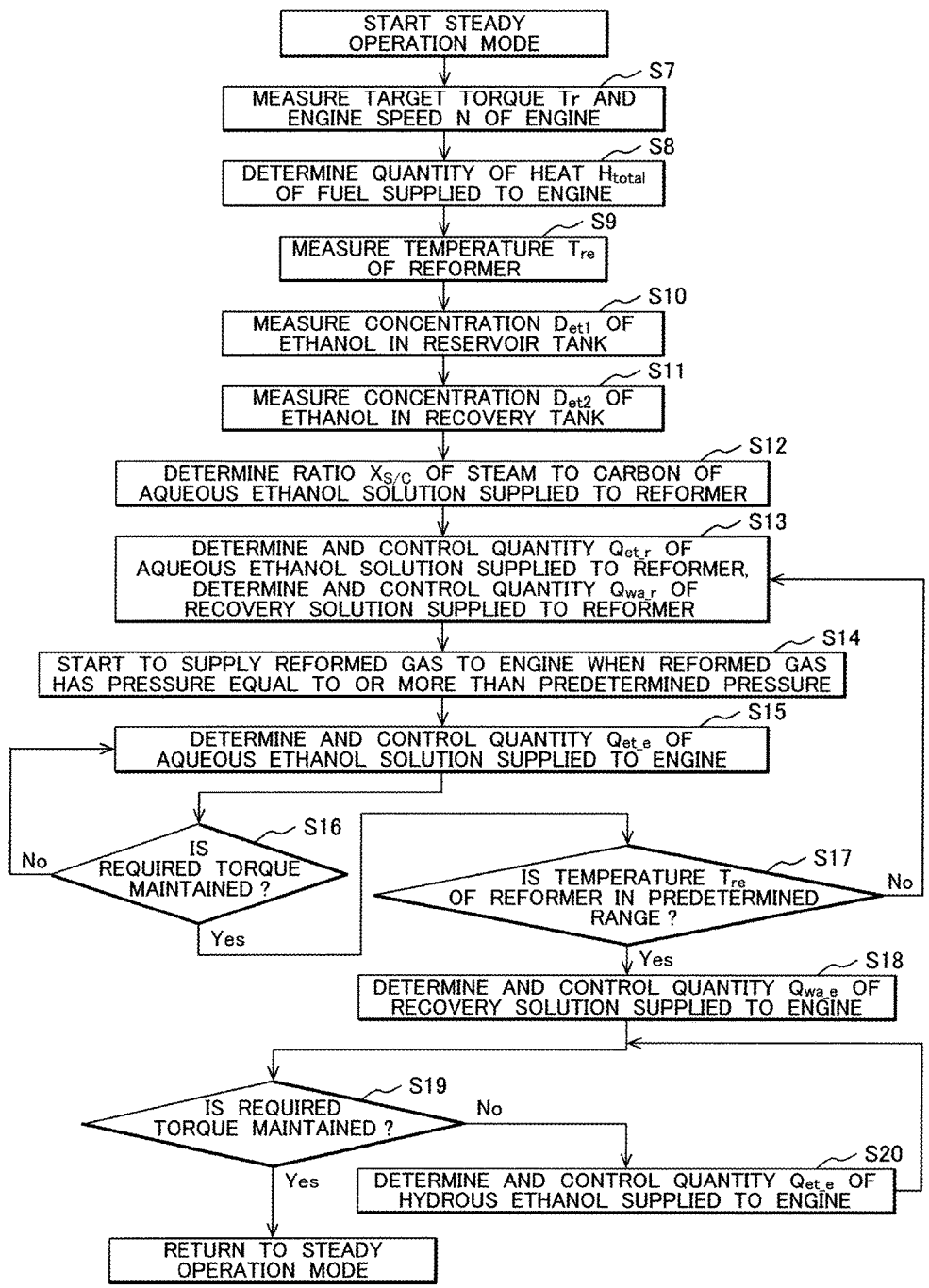
FIG. 6 shows a control flow in a steady operation mode of the ethanol engine system equivalent to the embodiment of the present invention.

FIG. 6 is a flowchart showing a procedure executed by the controller in the steady operation mode of the ethanol engine system S.

The controller 7 instructs to measure target torque Tr and engine speed N of the engine 1 (a step S7) and determines a calorific value $H_{total}$ of fuel supplied to the engine 1 according to the target torque and the engine speed (a step S8). Next, the controller 7 instructs of measure the temperature of the reformer 2 by the temperature sensor not shown arranged in the suitable location of the reaction cell of the reformer 2 (a step S9). Afterward, the controller instructs concentration detectors 108, 106 to detect ethanol concentration $D_{et1}$ in the reservoir tank 4 and ethanol concentration $D_{et2}$ in the recovery tank 5 (steps S10, S11). At this time, when ethanol concentration $D_{et1}$ in the reservoir tank 4 is already known, the detection is not required. Next, the controller determines ratio $X_{SC}$ of water vapor to carbon in the aqueous ethanol solution supplied to the reformer 2 (a step S12) and determines the quantity $Q_{et\_r}$ of the aqueous ethanol solution supplied to the reformer 2 and the quantity $Q_{wa\_r}$ of the recovery solution supplied to the reformer (a step S13). The controller 7 issues a control instruction to the first supply device 103 and the first recovery solution supply device 102, and the aqueous ethanol solution and the recovery solution are supplied to the reformer 2. Calculation formulas are defined as follows.

The quantity of ethanol supplied to the reformer shall be A and the quantity of water supplied to the reformer shall be B.

$$A = Q_{et\_r} \cdot D_{et1} + Q_{wa\_r} \cdot D_{et2} \quad \text{Expression (5)}$$

$$B = Q_{et\_r} \cdot (1 - D_{et1}) + Q_{wa\_r} \cdot (1 - D_{et2}) \quad \text{Expression (6)}$$

$$X_{S/C} = B/(0.5 \cdot A) \quad \text{Expression (7)}$$

Since a calorific value of ethanol becomes 1.24 times when reforming reaction in the expression (1) is performed, a supplied amount of ethanol supplied to the reformer is calculated by the following expression on the basis of a calorific value of fuel required for the engine.

$$A = H_{total}/H_{et}/1.24 \cdot \alpha \qquad \text{Expression (8)}$$

$H_{et}$ shall be a lower calorific value of ethanol. $\alpha$ is a correction coefficient and will be described later. The quantity $Q_{et}$ of the aqueous ethanol solution supplied to the reformer and the quantity $Q_{wa\ r}$ of the recovery solution supplied to the reformer are determined on the basis of the expressions (5) to (8) and the following expressions (9), (10).

$$Q_{wa\ r} = A(1-D_{et1})(1-0.5X_{S/C})/D_{et1}/\{D_{et2}(1-D_{et1})/D_{et1}-(1-D_{et2})\} \qquad \text{Expression (9)}$$

$$Q_{et\ r} = (A - D_{et2} \cdot Q_{wa\ r})/D_{et1} \qquad \text{Expression (10)}$$

A calorific value of the reformed gas supplied to the engine is equal to or below $H_{total}$ according to the expression (8). Since the temperature, the pressure and a state of the catalyst of a reforming reaction location vary because exhaust heat of the engine is supplied to the reformer, conversion ratio in reforming from the aqueous ethanol solution to hydrogen and carbon monoxide varies. Therefore, it is difficult to meet torque required by a user by only heat supplied by the reformed gas. Accordingly, the calorific value of the reformed gas is set to be equal to or below $H_{total}$ using the expression (8).

Next, when the pressure of the reformed gas is equal to or higher than a predetermined value (the pressure of the reformed gas is measured by a pressure gage not shown), the controller 7 issues a signal to the reformed gas supply device 101 so as to supply the reformed gas to the engine (a step 14). Afterward, the controller 7 determines the aqueous ethanol solution ($Q_{et\ e}$) supplied to the engine so as to meet required torque and transmits a signal to the second supply device 107 so as to adjust the quantity of the aqueous ethanol solution supplied to the engine (a step 15). The controller 7 determines whether the required torque is met or not (a step 16) and returns the process to the step 15 so as to adjust the aqueous ethanol solution ($Q_{et\ e}$) supplied to the engine when the required torque is not met. Hereby, even if components of the reformed gas vary, engine torque required by a user can be output by directly supplying the aqueous ethanol solution to the engine.

Figure 10:
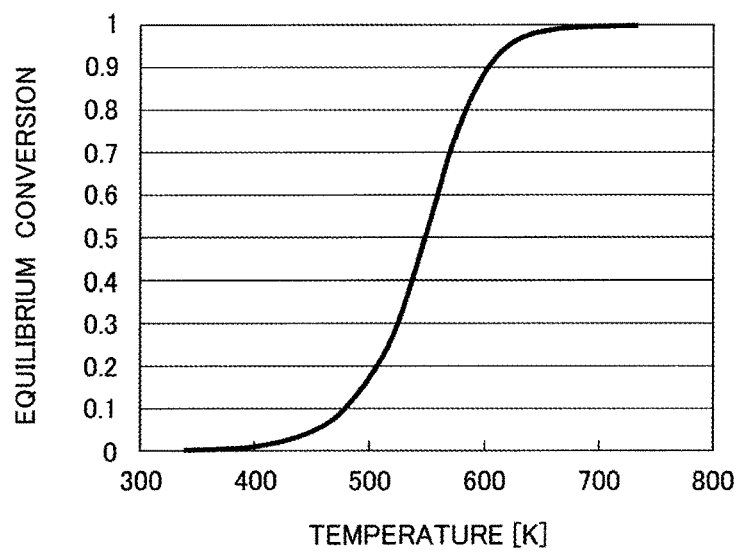
FIG. 10 shows relation between temperature of the hydrous ethanol and an equilibrium conversion.

Next, when the required torque is met, the controller 7 determines whether the temperature $T_{re}$ of the reformer 2 is in a range of predetermined temperature or not (a step S17). The predetermined temperature is for judging whether the reformer 2 is in a range of predetermined reforming temperature or not and is preset in a range of 250 to 500° C. for example. In the step S17, when it is determined that the temperature of the reformer 2 is outside the predetermined range, each supplied quantity of the quantity of the aqueous ethanol solution ($Q_{et\ r}$) and the quantity of the recovery solution ($Q_{wa\ r}$) supplied to the reformer 2 is adjusted so as to set the temperature of the reformer 2 in the predetermined range. Concretely, when the temperature is lower than the predetermined temperature, a supply of the quantity of the aqueous ethanol solution ($Q_{et\ r}$) and the quantity of the recovery solution ($Q_{wa\ r}$) supplied to the reformer 2 is reduced and when the temperature is higher than the predetermined temperature, a supply of the quantity of the aqueous ethanol solution ($Q_{et\ r}$) and the quantity of the recovery solution ($Q_{wa\ r}$) supplied to the reformer 2 is increased. This reason is that reforming reaction depends upon temperature and when the temperature is equal to or below the predetermined temperature, the efficiency of reforming reaction is greatly deteriorated (see equilibrium conversion in the reforming reaction of the aqueous ethanol solution in the expression (1) shown in FIG. 10). Besides, the reason is that when the temperature $T_{re}$ of the reformer is higher than the predetermined range, deterioration such as coking readily occurs in the reformer 2. Since reforming reaction in the expression (1) is endothermic reaction, the temperature $T_{re}$ of the reformer lowers when the quantity of the aqueous ethanol solution $Q_{et\ r}$ increases. To make the conversion ratio of reforming reaction equal to or higher than a predetermined value and to inhibit the deterioration of the reformer 2, the supply of the quantity of the aqueous ethanol solution $Q_{et\ r}$ and the quantity of the recovery solution $Q_{wa\ r}$ supplied to the reformer is adjusted so as to keep the temperature $T_{re}$ of the reformer in the predetermined range. Consequently, engine torque required by a user can be output, maximally enhancing a rate of the reformed gas supplied to the engine.

The supply of supply of the quantity of the aqueous ethanol solution ($Q_{et\ r}$) and the quantity of the recovery solution ($Q_{wa\ r}$) supplied to the reformer 2 is adjusted by a correction factor $\alpha$ in the expression (8) concretely according to an instruction from the step S17 to the step S13. When the temperature $T_{re}$ of the reformer is higher than the predetermined range, the correction factor $\alpha$ is increased and when the temperature $T_{re}$ of the reformer 2 is lower than the predetermined range, the correction factor $\alpha$ is decreased. At that time, when the correction factor $\alpha$ is larger than 1, the abnormality in the temperature $T_{re}$ of the reformer is notified. This means that the reformed gas which is equal to or exceeds torque required by a user is supplied to the engine and the notification is performed to prevent the catalyst from being deteriorated. At this time, the supply of exhaust gas to the reformer 2 is stopped (utilizing a selector valve (not shown) mounted between the reformer 2 and the engine for example). The correction factor $\alpha$ is mapped for engine speed and torque of the engine, is updated as required, and is stored in the controller 7 when the engine is stopped. Hereby, optimum control is executed according to the variation of outside air temperature and a deteriorated state of the catalyst in the reformer 2 and engine torque required by a user can be output, maximally enhancing a rate of the reformed gas supplied to the engine.

Next, when the temperature of the reformer 2 is judged to be in the predetermined range in the step S17, the controller 7 determines the quantity $Q_{wa\ e}$ of the recovery solution supplied to the engine and the controller instructs the second recovery solution supply device 104 to supply the recovery solution to the engine (the step S12). This is determined by the rotating torque $T_r$ and the engine speed N of the engine.

Next, the controller 7 determines whether required torque is met or not (a step S19). When required torque is met in the step S19, the controller returns the process, when the torque is different from the required torque, the process proceeds to a step S20, and the quantity of the aqueous ethanol solution $Q_{et\ e}$ supplied to the engine is determined. As the calorific value of the reformed gas depends upon the conversion ratio of the reformer, it is difficult to match the calorific value of the reformed gas with a calorific value of fuel required by the engine. Besides, cooling loss of the engine is reduced by supplying the recovery solution to the engine and consequently, engine torque increases. Thereby, fuel can be supplied to the engine in accordance with torque required by a user by adjusting the quantity of the aqueous ethanol solution $Q_{et\ e}$ supplied to the engine.

In the case of a system configuration that the second recovery solution supply device 104 is omitted in the configuration shown in FIG. 1 and the recovery solution is supplied to only the reformer 2, the step 18 shown in FIG. 6 is omitted and control by the controller 7 is executed. Besides, in the case of a system configuration that the first recovery solution supply device 102 is omitted and the recovery solution is supplied to only the engine 1, the steps 11, 12 are omitted and a part of "DETERMINE AND CONTROL QUANTITY $Q_{wa\_r}$ OF RECOVERY SOLUTION SUPPLIED TO REFORMER" in the step 13 is omitted. The quantity $Q_{et\_r}$ of the aqueous ethanol solution supplied to the reformer is determined by the following expression (11). The quantity of ethanol A supplied to the reformer is calculated in the expression (8).

$$Q_{et\_r} = A/D_{et1} \qquad \text{Expression (11)}$$

Second Embodiment

An ethanol engine system equivalent to this embodiment generates motive power by supplying the reformed gas acquired by using ethanol for a carbon source and second fuel to an engine. The description of the same configuration as that in the first embodiment is omitted.

<Configuration of Ethanol Engine System (Variation)>

Figure 7:
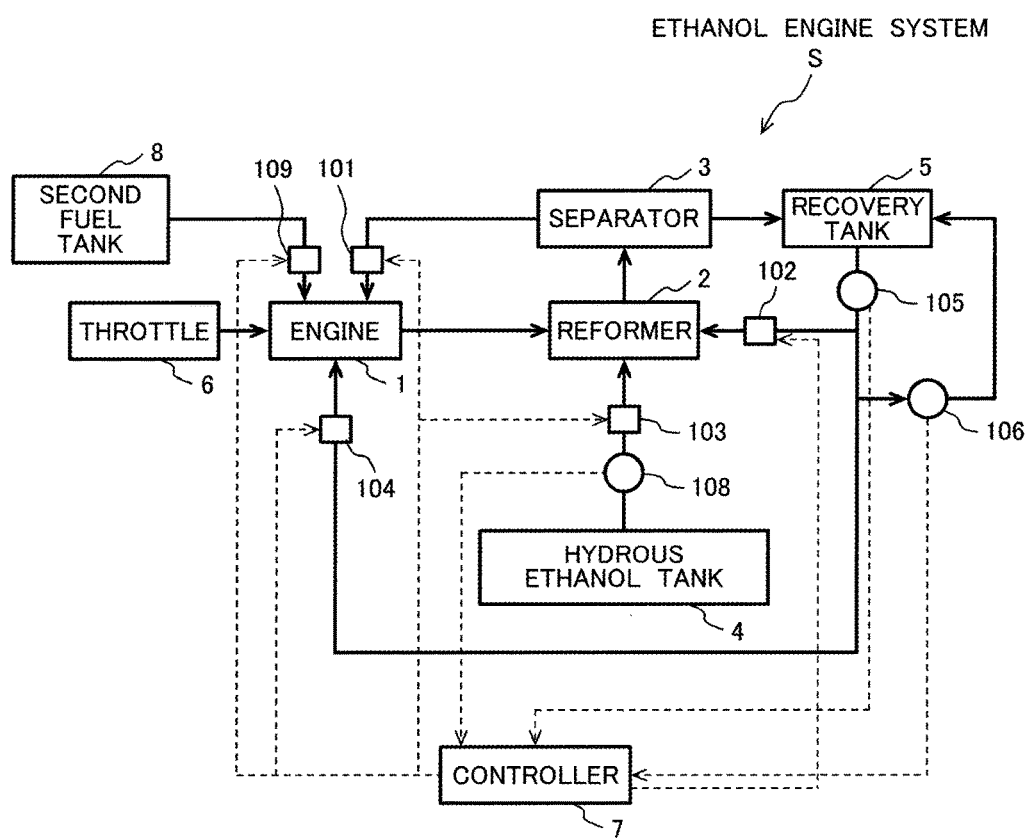
FIG. 7 illustrates a configuration of a variation of the ethanol engine system equivalent to the embodiment of the present invention.

FIG. 7 shows an example of another configuration of the ethanol engine system S. A fuel tank 8 separate from a reservoir tank 4 for reserving the aqueous ethanol solution is provided and second fuel is supplied from the second fuel tank 8 to the engine 1. The second fuel is hydrocarbon fuel such as gasoline, gas oil, natural gas and fuel oil. However, especially, the second fuel is not limited to the hydrocarbon fuel, and the second fuel may also be fuel including no carbon content such as ammonia. The second fuel is supplied to the engine 1 via fuel supply equipment 109 in a state in which a supplied amount is adjusted. Since the reformed gas that uses the aqueous ethanol solution partially includes hydrogen, a combustible range is wider, compared with the second fuel and combustion velocity is fast. Therefore, combustion efficiency and cycle efficiency are enhanced by mixedly combusting the second fuel and the reformed gas. Besides, the recovery solution collected in a recovery tank 5 is directly supplied to a reformer 2 and the engine 1 via a first recovery solution supply device 102 and a second recovery solution supply device 104. A supplied amount of the recovery solution to the reformer 2 and the engine 1 is adjusted by the first recovery solution supply device 102 and the second recovery solution supply device 104.

Figure 8:
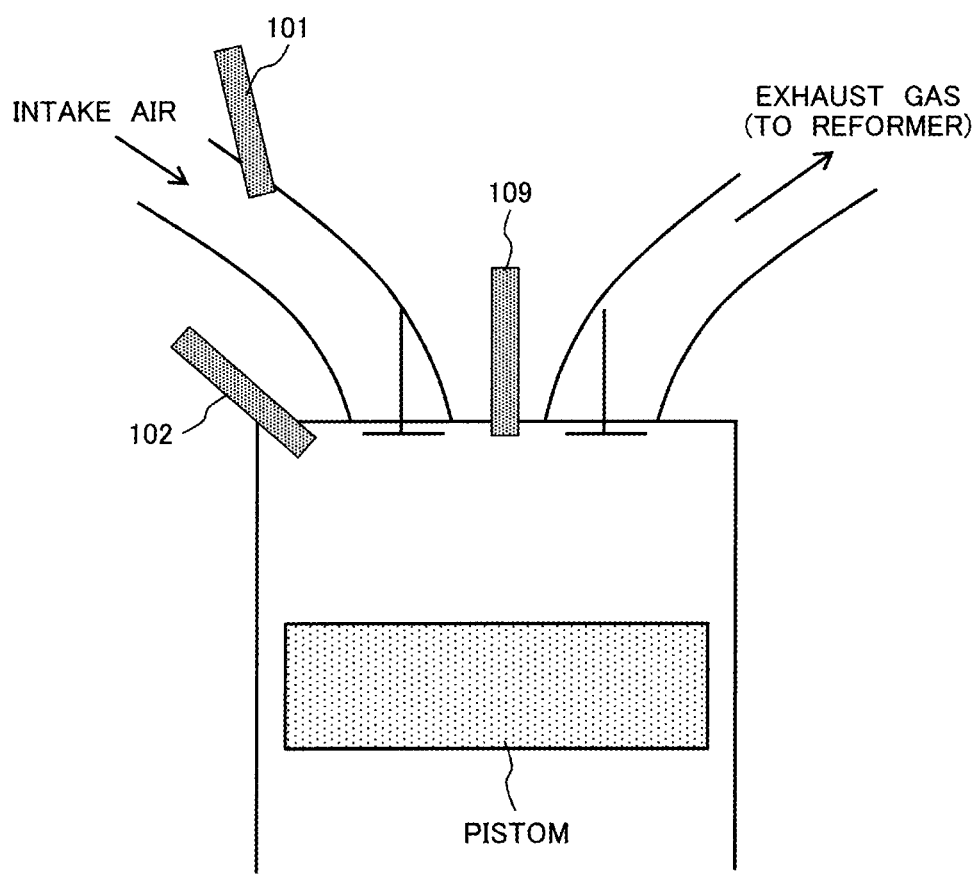
FIG. 8 is a partial enlarged view schematically showing the vicinity of a cylinder head of an engine configuring an ethanol engine system (the variation) equivalent to an embodiment of the present invention.

FIG. 8 is a partially enlarged view schematically showing the vicinity of a cylinder head in this embodiment. FIG. 8 is a schematic diagram showing the engine when gas oil and fuel oil which are respectively more ignitable, compared with the aqueous ethanol solution are used for the second fuel. The engine is a diesel engine. The reformed gas that passes a separator 5 as in the first embodiment is supplied to an intake pipe of the engine 1 by a reformed gas supply device 101, is premixed with air there, and is supplied to the inside of the engine. In the meantime, the second fuel is directly supplied into the engine 1 by the second fuel supply device 109 and is combusted by self-ignition caused by compression by a piston. Premixture of the reformed gas and air is ignited by the self-ignition combustion of the second fuel (a part is self-ignited) and expansion work by the piston can be extracted. When gas oil and fuel oil are combusted in a normal diesel engine, soot and NOx are exhausted a lot because of diffusive combustion and an after-treatment device and others are required to be installed in an exhaust pipe. In the ethanol engine system equivalent to this embodiment, as the reformed gas acquired by using hydrogen for a part of fuel is supplied to the engine in a premixed state with air, a rate of diffusive combustion by gas oil and fuel oil decreases and a rate of premixed combustion increases. Consequently, as relatively uniform air-fuel mixture can be combusted and the exhaust of soot and NOx can be reduced, equipment for after treatment can be reduced. Besides, as gas oil and fuel oil which are respectively excellent in ignitability function as a trigger of combustion initiation and ignition occurs in many locations in space, effect that premixture of the reformed gas and air can also be combusted on an air excess condition (on a dilution condition) and consequently, cycle efficiency is enhanced is acquired.

The second recovery solution supply device 104 is connected to a combustion chamber of the engine for example and is provided with a structure that enables directly supplying water to the combustion chamber of the engine. Hereby, the second recovery solution supply device enables cooling a part such as a piston in the combustion chamber. The piston is made of materials lower in thermal conductivity than an aluminum alloy. Therefore, supplied water has effect of inhibiting the temperature rise of the piston. Heat in the combustion chamber of the engine is thermally conducted to engine cooling water via a member such as a piston in the combustion chamber, however, the member of the engine combustion chamber can be cooled from the inside by supplying water into the engine and a heat transfer amount to engine cooling water can be reduced. Consequently, cooling loss can be reduced and thermal efficiency is enhanced. Especially, as the ethanol engine system in this embodiment has a configuration that no aqueous ethanol solution is supplied to the engine 1, effect by the supply of the recovery solution into the combustion chamber of the engine 1 is great.

Figure 9:
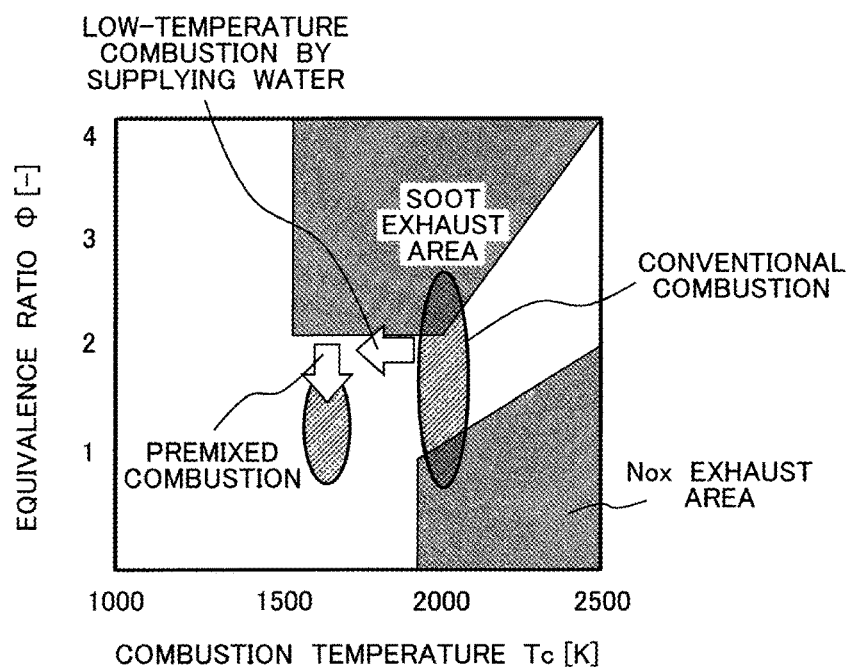
FIG. 9 shows relation among exhaust areas of soot and NOx, equivalence ratio Φ and combustion temperature Tc.

FIG. 9 shows relation among an exhaust area of soot and NOx in the diffusive combustion of gas oil and fuel oil, equivalence ratio ($\Phi$) and combustion temperature (Tc). In conventional type combustion (only the second fuel), as diffusive combustion accounts for a great rate and the conventional type combustion is uneven, its combustion temperature and its equivalence ratio have a wide range and the wide range is overlapped with exhaust areas of soot and NOx. In the meantime, combustion temperature can be lowered by supplying the recovery solution to the engine and consequently, the exhaust of NOx is reduced. Besides, as a rate of diffusive combustion decreases by supplying the reformed gas to the engine, a range of its equivalence ratio and its combustion temperature narrows as shown in FIG. 9 and consequently, the exhaust of soot also decreases. Hereby, the enhancement of thermal efficiency and the decrease of exhaust components such as soot and NOx can be simultaneously realized by supplying the reformed gas of the aqueous ethanol solution and the recovery solution to the diesel engine using the second fuel.

Effect when another fuel such as biofuel is supplied as second fuel will be described below. In one case, biofuel is used for a diesel engine alone and in another case, biofuel is mixed with gas oil and their mixture is used. Besides, fuel called GTL is also used for a diesel engine in addition to biofuel. Since biodiesel fuel and GTL are different in ignitability, injection timing of fuel, injection quantity, an amount of EGR and supercharging pressure are normally controlled so as to enhance thermal efficiency and reduce exhaust components such as NOx and soot. In the ethanol engine system in this embodiment, the temperature of the inside of the engine can be lowered by latent heat of the evaporation of water by supplying water from the second recovery solution supply device 104. That is, gas temperature in the engine can be controlled by controlling a supplied amount of the recovery solution to the engine and hereby, ignition timing of the second fuel can be controlled. Besides, since the gas temperature in the engine can be adjusted, combustion temperature can be controlled and exhaust components such as NOx and soot can also be reduced. Hereby, combustion in which thermal efficiency is high and exhaust components such as soot and NOx are scarcely included can be realized by controlling the quantity of the recovery solution supplied from the second recovery solution supply device 104 when components of the second fuel vary. That is, a system applicable to a variety of fuel is formed. The second recovery solution supply device 104 may also be connected to the intake pipe of the engine without being directly installed in the combustion chamber. In that case, intake air can be cooled by latent heat of the evaporation of water and the above-mentioned similar effect is acquired.

The operation of the ethanol engine system S in this embodiment shown in FIG. 7 is executed by partially changing the control flows shown in FIGS. 5 and 6. In an operation mode in starting, contents of the step S1 shown in FIG. 5 are changed to "SUPPLY SECOND FUEL TO ENGINE SO AS TO START ENGINE" and contents of the step S3 are changed to "DETERMINE AND CONTROL QUANTITY OF SECOND FUEL SUPPLIED TO ENGINE". Besides, in a steady operation mode, "DETERMINE AND CONTROL QUANTITY OF AQUEOUS ETHANOL SOLUTION SUPPLIED TO ENGINE" in the steps S9 and S14 shown in FIG. 6 is changed to "DETERMINE AND CONTROL SUPPLIED AMOUNT OF SECOND FUEL SUPPLIED TO ENGINE".

Besides, the ethanol engine system S shown in FIG. 7 has the configuration that the recovery solution can be supplied to both the engine 1 and the reformer 2. However, the ethanol engine system may also have a configuration that the recovery solution is supplied to only either of the reformer 2 or the combustion chamber of the engine 1 as in the first embodiment.

REFERENCE SIGNS LIST

1 Engine
2 Reformer
3 Separator
4 Reservoir tank
5 Recovery tank
6 Throttle
7 Controller
8 Second fuel tank
101 Reformed gas supply device
102 First recovery solution supply device
103 First supply device
104 Second recovery solution supply device
105 Pump
106, 108 Concentration detector
107 Second supply device
109 Fuel supply equipment

The invention claimed is:
1. An ethanol engine system comprising:
a reservoir tank of an aqueous ethanol solution;
a first supply device, including at least a first injector and a first pump, which supplies the aqueous ethanol solution in the reservoir tank to a reformer;
a separator which separates a mixed gas into gas and liquid by cooling the mixed gas including a reformed gas fed from the reformer and condensing a water vapor included in the mixed gas;
a reformed gas supply device, including at least a second injector and a second pump, which supplies the reformed gas separated by the separator to an engine;
a recovery tank which collects a recovery solution separated in the separator; and
a first recovery solution supply device, including at least a third injector and a third pump, which supplies the recovery solution in the recovery tank to the reformer and a second recovery solution supply device, including at least a fourth injector and a fourth pump, which supplies the recovery solution in the recovery tank directly to a combustion chamber of the engine.

2. The ethanol engine system according to claim 1, wherein the reformed gas supplied from the reformed gas supply device includes an ethanol vapor.

3. The ethanol engine system according to claim 1, wherein the recovery solution is water or an aqueous solution including water as a principal component.

4. The ethanol engine system according to claim 1, comprising a second supply device, including at least a fifth injector and a fifth pump, which supplies the aqueous ethanol solution in the reservoir tank to the combustion chamber of the engine.

5. The ethanol engine system according to claim 1, wherein temperature of the mixed gas emitted from the separator is 78° C. or higher and is below 100° C.

6. The ethanol engine system according to claim 5,
wherein the separator includes a condenser which thermally exchanges the mixed gas fed from the reformer and a cooling medium; and a temperature sensor which senses the temperature of the mixed gas emitted from the condenser, and
a control means which controls the temperature of the mixed gas emitted from the separator by adjusting a flow rate of the cooling medium supplied to the condenser on the basis of the temperature of the mixed gas detected by the temperature sensor.

7. The ethanol engine system according to claim 1, wherein the separator includes a condenser which thermally exchanges the mixed gas fed from the reformer and a cooling medium, and uses at least one of the aqueous ethanol solution supplied to the reformer or the recovery solution supplied to the reformer as the cooling medium.

8. The ethanol engine system according to claim 1, comprising a fuel supply equipment which supplies a second fuel except the aqueous ethanol solution to the engine.

9. The ethanol engine system according to claim 8, wherein the second fuel has a higher ignitability than ignitability of the aqueous ethanol solution.

10. The ethanol engine system according to claim 8, wherein the engine is a diesel engine, and the second fuel is combusted by self-ignition owing to compression by a piston.

* * * * *